(12) United States Patent
Loureda et al.

(10) Patent No.: US 10,880,599 B2
(45) Date of Patent: Dec. 29, 2020

(54) MEDIA SYSTEM ANALYSIS AND CONTROL

(71) Applicant: Sky CP Limited, Middlesex (GB)

(72) Inventors: Jose Sanchez Loureda, South Croydon (GB); Gavin Meggs, Rickmansworth (GB); Sarah Moore, London (GB); Julie Chung, Bristol (GB); Robert Stafford, Middlesex (GB); Michael Scott, Hemel Hempstead (GB); Shaun Russell, Surrey (GB); Jason Thompson, St Albans (GB); Jonathan Green, Leamington Spa (GB); Christopher Spencer, Middlesex (GB)

(73) Assignee: SKY CP LIMITED

( * ) Notice: Subject to any disclaimer, the term of this patent is extended or adjusted under 35 U.S.C. 154(b) by 0 days.

(21) Appl. No.: 15/534,957

(22) PCT Filed: Dec. 8, 2015

(86) PCT No.: PCT/GB2015/053760
§ 371 (c)(1),
(2) Date: Jun. 9, 2017

(87) PCT Pub. No.: WO2016/092294
PCT Pub. Date: Jun. 16, 2016

(65) Prior Publication Data
US 2017/0373774 A1    Dec. 28, 2017

(30) Foreign Application Priority Data
Dec. 9, 2014  (GB) .................................. 1421876.2

(51) Int. Cl.
*H04N 21/442* (2011.01)
*H04H 60/40* (2008.01)
(Continued)

(52) U.S. Cl.
CPC ... *H04N 21/44204* (2013.01); *G06Q 30/0271* (2013.01); *H04H 20/106* (2013.01);
(Continued)

(58) Field of Classification Search
CPC .... H04H 20/106; H04H 60/372; H04H 60/40; H04H 60/375; H04H 60/31;
(Continued)

(56) References Cited

U.S. PATENT DOCUMENTS 7,954,120 B2    5/2011   Roberts
7,962,604 B1 *  6/2011   Morris ................... G06Q 30/02
                                                     705/14.4
(Continued)

FOREIGN PATENT DOCUMENTS

CA   2693583 A1   8/2010
EP   1646169 A1   4/2006
(Continued)

OTHER PUBLICATIONS

International Search Report and Written Opinion dated Apr. 12, 2016, for PCT Application No. PCT/GB2015/053760.

*Primary Examiner* — Pankaj Kumar
*Assistant Examiner* — Alexander Boyd
(74) *Attorney, Agent, or Firm* — Katten Muchin Rosenman LLP

(57) ABSTRACT

A method of processing media output events, each having a corresponding duration, from a plurality of media content receivers within a media distribution system, comprises: a. dividing the output events into a plurality of segments, such that output events having similar properties are placed into the same one of said segments; b. within each said segment, identifying a long duration threshold based on the distribution of the durations of the output events within that segment; c. and applying the long duration thresholds of each
(Continued)

said segment for control and/or analysis of the media distribution system.

12 Claims, 10 Drawing Sheets

(51) Int. Cl.
| | |
|---|---|
| H04H 60/31 | (2008.01) |
| H04N 21/458 | (2011.01) |
| H04N 21/6547 | (2011.01) |
| H04N 21/6543 | (2011.01) |
| H04N 21/658 | (2011.01) |
| G06Q 30/02 | (2012.01) |
| H04N 21/25 | (2011.01) |
| H04H 20/10 | (2008.01) |
| H04H 60/37 | (2008.01) |

(52) U.S. Cl.
CPC .......... *H04H 60/31* (2013.01); *H04H 60/372* (2013.01); *H04H 60/40* (2013.01); *H04N 21/25* (2013.01); *H04N 21/44222* (2013.01); *H04N 21/458* (2013.01); *H04N 21/6543* (2013.01); *H04N 21/6547* (2013.01); *H04N 21/6582* (2013.01); *H04H 60/375* (2013.01)

(58) Field of Classification Search
CPC ....... H04N 21/44016; H04N 21/44204; H04N 21/44222; H04N 21/458; H04N 21/4586; H04N 21/812; H04N 21/25; H04N 21/6543; H04N 21/6547; H04N 21/6582; G06Q 30/0271
See application file for complete search history.

(56) References Cited

U.S. PATENT DOCUMENTS

| | | | |
|---|---|---|---|
| 8,484,511 | B2 | 7/2013 | Tidwell et al. |
| 8,631,473 | B2* | 1/2014 | Bhatia .............. H04N 21/44204 726/4 |
| 8,701,134 | B2 | 4/2014 | Whinmill |
| 8,863,166 | B2 | 10/2014 | Harsh et al. |
| 8,938,748 | B1* | 1/2015 | Mirisola .......... H04N 21/44204 725/10 |
| 2005/0120366 | A1 | 6/2005 | Thurbon |
| 2006/0075421 | A1* | 4/2006 | Roberts .................. H04H 60/32 725/9 |
| 2008/0097949 | A1* | 4/2008 | Kelly ............... H04N 21/44204 706/52 |
| 2008/0300965 | A1 | 12/2008 | Nielsen |
| 2010/0333125 | A1 | 12/2010 | Eldering et al. |
| 2011/0239243 | A1* | 9/2011 | Dierks ............. H04N 21/44222 725/14 |
| 2012/0005527 | A1 | 1/2012 | Engel |
| 2012/0260280 | A1 | 10/2012 | Harsh et al. |
| 2013/0061256 | A1 | 3/2013 | Whinmill et al. |
| 2015/0302462 | A1* | 10/2015 | Chan .................. G06Q 30/0243 705/14.42 |

FOREIGN PATENT DOCUMENTS

| | | |
|---|---|---|
| EP | 2247007 A1 | 11/2010 |
| GB | 0919785.6 | 11/2009 |
| GB | 0920943.8 | 2/2010 |
| GB | 2462554 A | 2/2010 |
| GB | 2476927 A | 7/2011 |
| GB | 2462554 B | 11/2011 |
| GB | 2476927 B | 1/2012 |
| GB | 201209541 | 5/2012 |
| GB | 2489841 A | 10/2012 |
| WO | 2012073028 A1 | 6/2012 |

\* cited by examiner

MEDIA SYSTEM ANALYSIS AND CONTROL

FIELD OF THE INVENTION

The present invention relates to media system analysis and control, particularly but not exclusively for a TV system that includes local insertion of advertisements.

BACKGROUND OF THE INVENTION

Audience measurement systems typically detect user interaction with the receiver apparatus in order to determine which content is being watched/listened to. For example, a channel change operation may be taken as an indication that the user has started watching the new channel, and the period until the next channel change may be taken as the duration for which the channel has been watched. Comparison of the timing of the channel changes with a predetermined programme schedule may be used to identify which programmes and/or advertisements were watched.

Media insertion systems involve the selection of a media item for output by a receiver during a predefined slot in a schedule either at time of broadcast or when playing back recorded or video-on-demand (VOD) programming, such as from a Personal Video Recorder (PVR). Where the programming includes content during the slot which may be replaced by media insertion, this replacement in referred to as media substitution. Such systems may be used for targeted substitutional advertising (TSA), where an advertisement (a commercial in US English) is selected for output based on a predefined user profile, without specific selection of the advertisement by the user. In a broadcast example, the user experience is similar to watching a broadcast with an advertising break, but the advertisements are tailored to the user profile by means of a selection made at the broadcast receiver. A default media item may be included in the broadcast programming during the slot, for output by receivers in which media substitution is not enabled, or by receivers not targeted by the substitution. An example of such a media insertion system is disclosed in the applicant's patent publication WO-A-2011/012909.

In linear scheduling systems, predicted audience figures and profiles for a particular programme are used to select which advertisements should be scheduled in a break within or adjacent that programme. The predicted audience figures are provided in the UK by the Broadcasters' Audience Research Board (BARB). The probability of a particular advertisement being output by a particular receiver is simply determined by the probability of that receiver being tuned to the channel in which the advertisement is scheduled, during the time slot in which the advertisement is scheduled. That probability is a function of the audience segment to which the receiver belongs.

In a media substitution system, the probability of a particular substitutional advertisement being output by a particular receiver is also dependent on the probability of that substitutional advertisement being selected by the receiver. Although predicted audience figures may be broken down by audience segment, these segments may not correspond to the segments at which the different substitutional options are targeted. Therefore, predicted audience figures are less useful for scheduling substitutional media items than for scheduling linear media items. It would therefore be desirable to measure and report viewing of substituted media items.

A problem with TV viewing measurement systems is that it is difficult to determine whether content output by the receiver is actually being watched. The receiver may be left switched on, but the display may be switched off, or the display may be left switched on while no-one is watching. Solutions have been proposed in which the users must periodically interact with the system to show they are still watching, or may be passively detected, for example by an infra-red detector or camera. However, these systems may be onerous or intrusive on the viewers.

STATEMENT OF THE INVENTION

According to one aspect of the present invention, there is provided a method according to claim 1. Other aspects of the present invention include a computer program product and system for performing the method.

BRIEF DESCRIPTION OF THE DRAWINGS

There now follows, by way of example only, a detailed description of embodiments of the present invention, with reference to the figures identified below.

DETAILED DESCRIPTION OF THE EMBODIMENTS

Receiver Details

Figure 1:
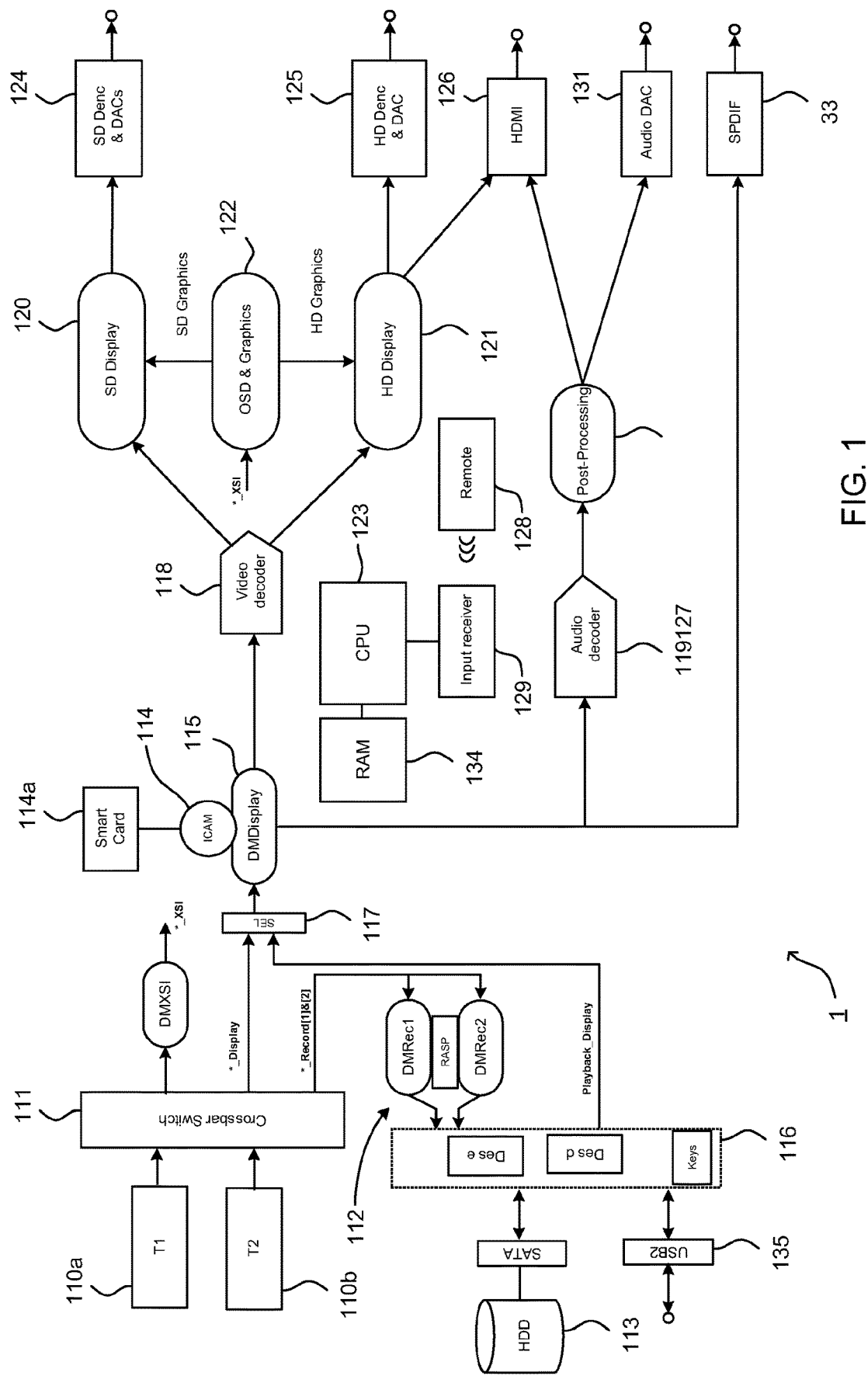
FIG. 1 is a diagram of the functional components of a specific embodiment of the receiver.

FIG. 1 shows in detail the functional components of a receiver 1 in specific embodiments of the invention. In this example, received signals are input to first and second tuners 110*a* and 110*b* but any number of tuners may be used in the receiver 1. The tuners 110*a* and 110*b* are tuneable into the same or different channels of the satellite television broadcast network for simultaneous reception of the same or different television programmes and/or media items. Signals from the first and second tuners 110*a* and 110*b* are passed to a crossbar switch 111 which separates the data received from the first and second tuners 10*a* and 10*b* into data for direct output to a television, data representing received television programmes for recording and subsequent playback, and user services and programme scheduling data, in accordance with the XSI standard, for example. The receiver 1 has a hard disk (or other storage medium) 113 which receives from the crossbar switch 111 compressed video and/or audio data for recording and subsequent playback via recording and playback circuitry 116. In the embodiment illustrated in FIG. 1, the receiver 1 includes two demultiplexer recording pipes (DMRec1 and DMRec2), which are coupled to Random Access Streaming Protocol circuitry (RASP) for analysing data in a received stream and indexing the data as it is received. The recording and playback circuitry 116 is also configured to perform decryption of received data, for example before the video and audio data is transmitted for playback on a display, using stored decryption keys according to the encryption technique used to encrypt the received data.

The received signals comprise digitally encoded data. In this example, the data is compressed using the Digital Video Broadcast/Moving Pictures Expert Group 2 or 4 (DVB/MPEG 2/4) or H.264 standard which permits both programme data and additional data (for example metadata and/or schedule data) to be transmitted in a single channel. The hard disk 113 receives and stores compressed data. The data is decompressed only after retrieval from the hard disk 113.

Satellite (and indeed cable) programmes are usually scrambled to restrict access to authorised users e.g. subscribers. The receiver 1 therefore has an Integrated Conditional Access Module (ICAM) 114 which co-operates with a smart card 114a to determine whether the viewer has subscribed to a particular channel and is therefore authorised to access the channel. Parental control over channel access is also provided, at least in part, by the access control circuit 114. The receiver 1 further comprises a demultiplexing and descrambling circuit 115 which receives from a selector 117 data from the crossbar switch 111 for direct output or data from the hard disk 113 for playback. The demultiplexing and descrambling circuit 115 separates the data into video data and audio data for distribution to various locations within the receiver 1. The demultiplexing and descrambling circuit 115 is also controlled by the access control circuit 114 to enable the descrambling of the signal by authorised subscribers. The receiver 1 also comprises a video decoder 118 for decompression and processing of encoded video data received from the demultiplexing and descrambling circuit 115, and an audio decoder 119 for decompression and processing of compressed audio data, operating according to the MPEG 2/4 standard, for example.

Decompressed video data is supplied to standard definition display circuitry 120 and/or high definition display circuitry 121 which combines the decompressed video data with corresponding standard definition or high definition on-screen display and graphics generated by on-screen display and graphics generation circuitry 122 using the user services and programme scheduling data. The standard definition display circuitry 120 provides the combined standard definition video and graphics data to a standard definition digital encoder and Digital to Analogue Converters (DACs) 124 where the data is encoded and converted into an appropriate format for direct input to a television set. The high definition display circuitry 121 supplies the combined high definition video and graphics data to a high definition digital encoder and Digital to Analogue Converter (DAC) 125 where the data is encoded into an appropriate high definition format for output to a high definition TV if so desired. The combined high definition video and graphics data is also supplied to a High Definition Multimedia Interface (HDMI) interface 126 which also receives decompressed audio data from the audio decoder 119 via audio post-processing circuitry 127, for output to an HDMI input of a high definition TV if so desired. Decompressed and processed audio data is also supplied to an audio DAC 131 for direct input to an analogue audio device or speakers. The demultiplexing and descrambling circuit 115 may also output compressed digital audio to a proprietary audio interface 133, for example in accordance with the Sony/Philips Digital Interconnect Format (SPDIF), for direct input to appropriate audio equipment.

The receiver 1 is controlled by a processor 123 which communicates with the various units of the receiver via a bus (not shown). The processor 123 has associated with it Random Access Memory (RAM) 134. The processor 123 controls operation of the receiver 1 by tuning the tuners 110a and 110b to receive signals for the desired channels by controlling the demultiplexing, descrambling and decompression so that the desired programme and/or interactive service data is displayed on the screen of the TV, and by controlling the hard disk 113 to record desired television programmes or to play back previously recorded television programmes. Viewer selection of desired programmes and customer services is controlled by viewer manipulation of a remote control unit 128, which in response to such viewer manipulation transmits control signals to an input receiver 129 for input to the processor 123. The remote control unit 128 also allows the viewer to control of the operation of the hard disk 113 to record television programmes, to play back recorded television programmes and to program the recording of television programmes, etc.

Operation of the receiver 1 is controlled by software that makes the processor 123 responsive to control signals from the remote control unit 128 and/or additional data in the received signals. Interaction between hardware and software in the receiver 1 may include functionality as described in detail in the Applicant's earlier international patent application published as WO 01/11865. Operation of the receiver 1 in receiving and decoding data representing television programmes and data defining scheduling and other information related to the programmes may include functionality as described in detail in the Applicant's earlier international patent application published as WO 96/37996. Operation of the receiver 1 in providing interactive services may include functionality as described in the Applicant's earlier international patent application published as WO 97/23997.

Within the Digital Video Broadcasting (DVB) standard for digital television broadcast there exists a standard for the transmission of schedule information such that it can be decoded and presented correctly to subscribers in the form of an Electronic Programme Guide (EPG). This DVB standard is known generally as the SI standard and can be found in the specification: ETS 300 468, ETSI Digital Broadcasting Systems for Television, Sound and Data Services; Specification for Service Information (SI) in Digital Video Broadcasting (DVB) Systems 2nd edition. Guidelines for using the specification are given in ETSI ETR 211—DVB SI Guidelines. The receiver 1 is preferably designed to support the SI specification.

In addition to operating data for use in controlling access to channels, additional data in a channel can include brief programme schedule data representative of so-called event information tables (EITs) defining the scheduling of programmes in each channel. The programme schedule data may be stored in the RAM 134 and, once stored, the scheduling information is available effectively instantaneously. Alternatively, the programme schedule data may be stored in the hard disk 113. The programme schedule data is transmitted regularly so that the receiver 1 will be updated substantially continuously. As those skilled in the art will appreciate, the transmitted information may be brief to enable each channel to carry a reduced set of programme schedule data without excessive overheads in terms of bandwidth requirements in each channel and memory requirements in the receiver.

In addition, a dedicated EPG channel transmits more detailed programme scheduling information, such as programme synopsis or other ancillary data associated with the scheduled programmes, which is stored in the hard disk 113. The receiver 1 is arranged to display the programme scheduling information for several of the channels over a predetermined period of time on the TV. Also, a viewer can interact with the receiver 1 to program recordings of television programmes, view a desired part of the available programme schedule, etc., on the basis of the information received via the dedicated EPG channel.

Since the tuners 10a and 10b can be tuned to receive different channels, it is possible for a first television programme in one channel to be displayed on a TV and recorded on the hard disk 113, while at the same time a second television programme in another channel is also recorded on the hard disk 113. Operation of the receiver 1 in providing simultaneous recording and playback may be as described in the Applicant's earlier international patent application published as WO 01/11865.

The hard disk 113 of the receiver 1 may be similar to conventional hard disks used in computer systems for storing large amounts of data. The hard disk 113 may have a capacity of many gigabytes (e.g. 400 gigabytes or more) and receive video and audio data via a SATA interface, for example, for storage in the compressed form in which it is received, for example, in accordance with the DVB/MPEG 2 standards as discussed above. This allows for the storage of several hours of television programmes (e.g. 100+ hours) on the hard disk 113. The hard disk 113 may comprise two or more storage areas, one for the storage of television programme data, and the other for storing metadata and/or recorded media items. The processor 123 controls the operation of the hard disk 113. More specifically, the processor 123 controls the recording and playback of television programmes to and from the hard disk 113. Other processors (not shown) can be used to control the hard disk 113 as appropriate.

The receiver 1 also includes an external interface 135, such as a Universal Serial Bus 2 (USB2) port. The USB2 interface may be connected to a transcoding device (not shown) via a USB connector, which allows media content in a first format to be supplied from the receiver 1 and transcoded by the connected transcoding device into a second media coding format suitable for playback on a Personal Media Player (not shown). Operation of the receiver 1 in providing transcoding services may be as described in the Applicant's earlier international patent application published as WO 06/125999.

The receiver 1 also includes a data interface (not shown), such as a wired or wireless network interface, or a telephony interface with modem, enabling a bidirectional data connection.

Media Substitution System Overview

Figure 2:
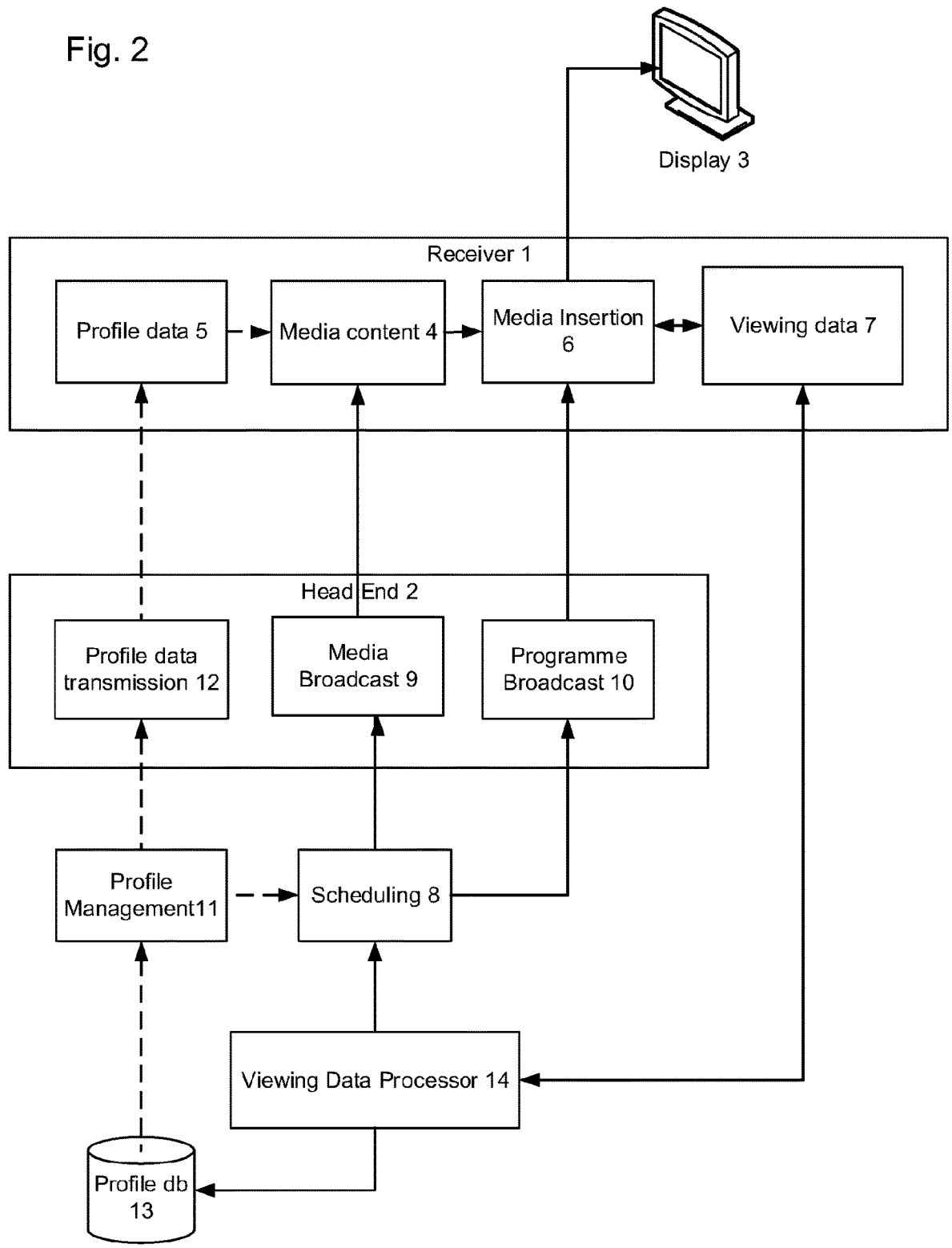
FIG. 2 is a schematic diagram of the main components of a media substitution and viewing measurement system in an embodiment of the present invention.

FIG. 2 shows schematically the main components of a media substitution system in an embodiment of the present invention, in which the programmes are video broadcast programmes and the substitutional media items comprise advertising video clips.

The receiver 1 is arranged to receive broadcast channels from a head end 2 over a broadcast link, and to output at least one of the received broadcast channels to a video display 3. The receiver 1 stores profile data 5 identifying preferences and/or demographics of one or more users or subscribers associated with the receiver 1. The receiver 1 also stores media content 4, comprising substitutional media items and associated metadata. The media items may be received over the broadcast link or another communications network link, in advance of their scheduled broadcast time.

A media insertion function 6 detects the occurrence of a substitutional slot in a currently received broadcast programme, and may select a substitutional media item for output to the video display during the substitutional slot, in place of the linear media content on the broadcast channel, based on the profile data. The linear media content will be output by broadcast receivers for which substitution is not enabled, either because the receiver is not capable of media substitution or because media substitution is inhibited. The linear media content will also be output by receivers for which substitution is enabled, but the profile data does not match the segments of any of the substitutional media items for that substitutional slot, or the appropriate substitutional media item has not been received.

Descriptions of the media content 4 necessary for the receivers 1 are compiled by the central scheduling function 8, which determines the scheduling of the media content 4. The media content 4 is output to a media broadcast function 9 for broadcast to the receivers 1 in advance of the scheduled times of the media content. The scheduling function 8 also outputs linear media items for insertion in a broadcast programme schedule executed by a programme broadcast function 10.

The profile data 5 stored on the receiver 1 may be generated by a profile management function 11, and sent to the receiver 1 by a profile data transmission function 12 at the head end 2.

Viewing Data

The receiver 1 records viewing data 7 indicating the broadcast programmes and/or media items output for display by the receiver 1, and sends the viewing data 7 to a central viewing data processor 14, for example via the network or telephony connection of the receiver 1. The viewing data processor 14 may process the viewing data 7 in order to provide viewing profile information to the database 13 and/or as input to the scheduling function 8. Furthermore, the viewing data processor 14 may send capping threshold data to the receiver 1, as described below.

The viewing data 7 may be generated in response to user interaction with the receiver 1, for example button presses on the remote control 128. Preferably, the viewing data 7 is recorded as a series of events, for example as listed below in Table 1.

TABLE 1

| Receiver Event Types | | |
| --- | --- | --- |
| Event Type | Description | Properties |
| evStandbyIn | The receiver went into standby. | Event Date/Time |
| evStandbyOut | The receiver went out of standby. | Event Date/Time |

TABLE 1-continued

Receiver Event Types

| Event Type | Description | Properties |
|---|---|---|
| evSurf | Channel was changed more than once on the receiver, and the transitory channels were each viewed for less than 5 seconds. | Event Date/Time |
| evChangeView | There was a change to what the receiver was showing, including:<br>Change channel<br>Entered the EPG<br>Started playing recorded content<br>Playback speed changed (e.g. pause) | Event Date/Time<br>Channel identifiers<br>Video playing<br>Playback speed<br>Recorded date/time |
| evVODPlayback | VOD playback | Event Date/Time<br>Video/audio playing<br>Playback speed |
| evSubstitution | Media item (e.g. advertisement) substitution | Event Date/Time<br>Start offset (time between start of substitute asset and playback time - zero for live viewing)<br>Campaign ID<br>Content ID<br>Slot ID |
| evNoSubstitution | Media item substitution event for which no valid substitution could be found | Event Date/Time<br>Slot ID<br>Reason |

Additionally, the viewing data 7 may identify advertisements selected for output by the receiver, as described below.

Substitutional Broadcast Method

Figure 3:
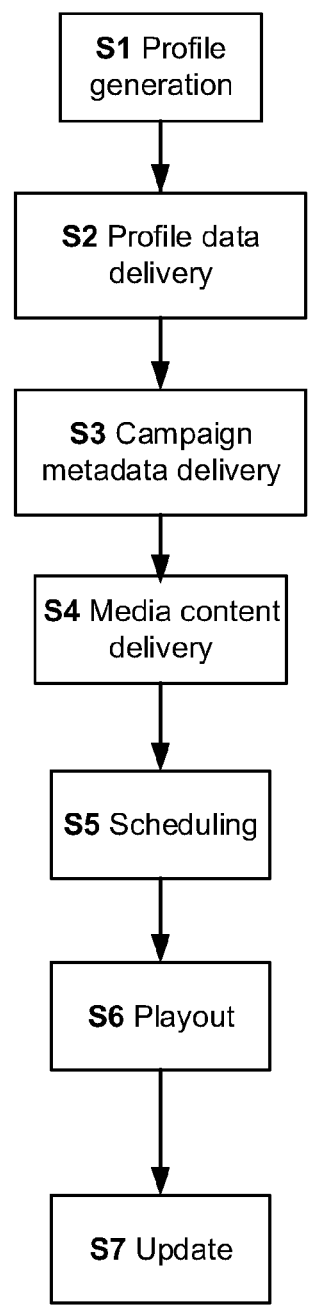
FIG. 3 is a flowchart of the steps involved in the operation of the media substitution system.

FIG. 3 represents the steps performed in a method of scheduling, delivering and displaying one or more substitutional advertising campaigns, in an embodiment of the invention. Each substitutional advertising campaign may comprise one or more media items, sometimes referred to as 'copy' or 'copy items', each media item being associated with a viewer profile segment defined by segment data and/or one or more segment rules associated with that item. For example, an advertising campaign for a range of cars may comprise a set of media items, each comprising an advertisement for a particular car in the range, designed to appeal to a segment of the market defined by the associated segment data and/or rule.

In the present embodiment the profile data 5 of each broadcast receiver 1 comprises a set of profile data items stored locally at the receiver. Each receiver 1 also has a unique identity, such as a subscriber card number (Subscriber ID) stored on a smart card accessible by the receiver 1. The profile management function 11 accesses a profile database 13 of subscriber details associated with the unique subscriber identities, including subscriber details provided when subscribing to the broadcast service, subscriber preferences provided via the receiver 1 or other communications link, and/or third party data which the subscriber has allowed to be used for this purpose. Hence, the profile database 13 stores a wealth of profile data items, which may be used to define profile data and/or segments. However, it would not be practicable for each broadcast receiver 1 to replicate all of its associated data items in the profile database 13, so as to be able to make a comparison with the profile segments of any particular campaign. Moreover, a predefined, fixed set of profile data items may require excessive processing by the receiver to identify whether the receiver 1 belongs to a particular segment. For example, a predefined profile data item may comprise a truncated postcode (used for example to determine a channel set—e.g. a bouquet or sub-bouquet—which the receiver 1 is enabled to receive), while a profile segment may be defined by a much larger region. To determine whether the truncated postcode corresponds to a particular region, the receiver 1 would need to obtain a list of truncated postcodes corresponding to each region, and compare its truncated postcode with the list of the postcodes.

Instead, in a profile generation step S1, profile data items are generated from the profile database 13 for use in one or more specific campaigns. For example, a campaign may include different media items for viewers in the North and South of England, so a campaign-specific profile data item may indicate whether a given subscriber is located in the North or South of England. The profile management function 11 interrogates the profile database 13 and determines a campaign-specific profile datum for each subscriber ID intended to receive the corresponding campaign. In this way, the profile data items stored on the profile database 13 may be used flexibly to define the segments for a specific campaign, without requiring a large quantity of profile data to be broadcast to or stored at the receiver 1.

The profile data may comprise a discrete set of profile data for each campaign, and/or general profile data that is not specific to a particular campaign. For example, the general profile data may comprise data likely to be of general use in defining segments, such as gender, age range, location, socio-economic group etc. This general profile data need only be updated occasionally, while campaign-specific data should be updated as new campaigns are introduced.

Also in the profile generation step S1, campaign metadata are compiled, comprising:
    For each campaign, a campaign ID and a list of segments
    For each segment, a segmentation rule and a media item identifier
    For each copy identifier, location information indicating where in the broadcast stream the media item is located In steps S2 and S3, the updated profile data items and the campaign metadata are acquired by the receivers 1 in advance of the substitutional slots to which the campaign metadata relate. Note that the order in which steps S2 and S3 are performed is not important. The updated profile data and campaign metadata may be transmitted periodically on one or more channels separate from programming channels and hidden from users of the receiver 1, and to which each receiver 1 may tune periodically, such as once a week. The profile data items may be portioned into blocks according to subscriber ID, so that the receiver 1 need only receive the block relevant to its subscriber ID, thus reducing the time for which the receiver 1 need be tuned to the hidden channel.

At step S2, each receiver 1 acquires its corresponding updated profile data items and updates its locally stored profile data accordingly. The campaign specific profile data may be broadcast in encrypted form such that only the receiver 1 having the associated subscriber ID may decode the corresponding campaign-specific profile data item(s), for example using a key stored on the smart card.

Figure 4:
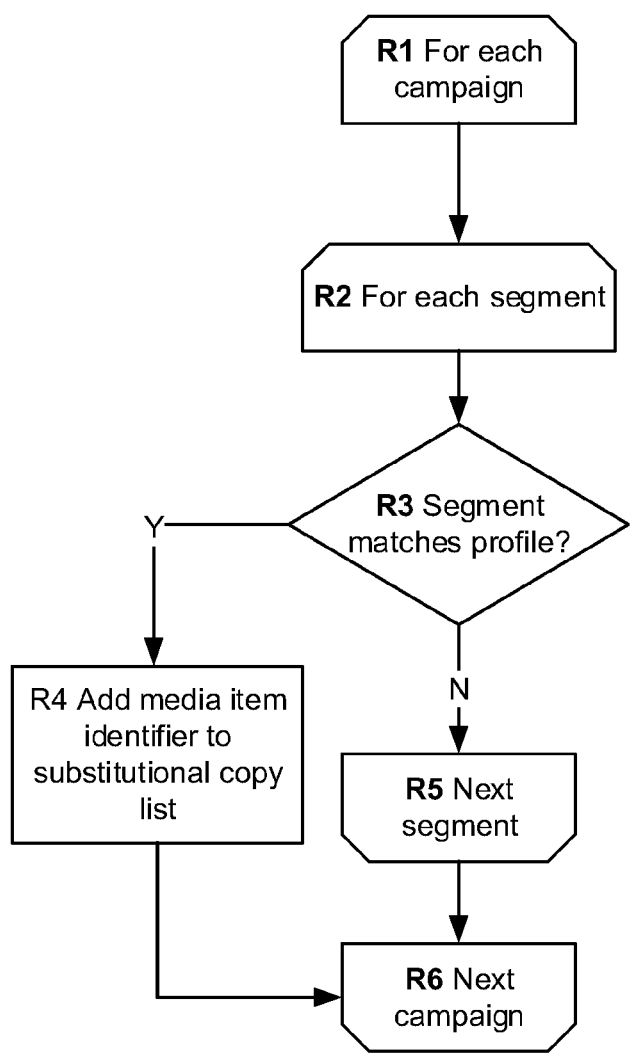
FIG. 4 is a flowchart of steps performed by the receiver in determining which media items to acquire.

At step S3, each receiver 1 acquires and stores the campaign metadata, and builds a substitutional copy list for itself by the following process, as shown in FIG. 4. For each campaign (step R1), the receiver 1 considers each segment in turn (R2), parses the associated segmentation rule, and attempts to match the segmentation rule with its stored profile data (R3). If a match is found, then the media item identifier for that segment is recorded in the substitutional copy list (R4) and the receiver 1 moves to the next campaign (R6); otherwise, the receiver 1 considers the next segment (R5). Since the receiver 1 can only output one substitutional media item at most per substitutional slot, it is not necessary to consider other segments in a campaign once a match is found.

The segmentation rule and profile data may be defined in many different ways. In one embodiment, campaign-specific profile data may simply indicate into which segment the associated receiver 1 has been categorised. The segmentation rule then merely requires the receiver 1 to match its previously indicated segment with one of the segments in the campaign metadata. In another embodiment, each segmentation rule may be expressed as a combination of different profile data items, which may not be campaign-specific, for example:

IF (GENDER=Male) and (REGION=Borders or Scotland) then SEGMENT=1
IF (GENDER=Female) and (REGION=Borders or Scotland) then SEGMENT=2 and so on.

Alternatively, the profile data could be dispensed with altogether and the campaign metadata could explicitly identify the receivers belonging to each segment. In that case, profiling is performed internally at the profile management function 11.

In a media content delivery step S4, each receiver 1 acquires the media items identified in the substitutional copy list. The media items may be stored in a partition of a local hard disc, for example. If an identified media item is already stored locally, it may be removed from the substitutional copy list and need not be acquired.

In an alternative embodiment, each receiver 1 may acquire and store all of the media items for a campaign, and may select one of the media items for output based on a later comparison of the associated profile data with the segment definitions for that campaign. This alternative is more wasteful of local storage, but allows the order of steps S2 and S3 to be reversed.

In a scheduling step S5, the scheduling function schedules the substitutional campaign into the broadcast schedule, as described in detail below. In outline, this step generates a substitutional schedule indicating which substitutional campaigns can be shown in which substitutional slots in a broadcast schedule. Each substitutional slot is defined by a splice point indicating the frame-specific timing of the start and/or end of the substitutional slot in a particular broadcast channel.

At this stage, automation events are booked into the broadcast schedule as metadata in the substitutional slot to enable the encoders of the programme broadcast function 10 to generate the splice point messages and perform any stream conditioning necessary to aid splicing at the receivers 1. Additional automation events may be booked into the broadcast schedule at or before the start of each programme break containing substitutional slots to allow the substitution options to be communicated to the receivers 1.

At a play out step S6, a booked automation event (or alternatively an event generated by the automation function generated using a substitutional slot look-ahead) causes the programme broadcast function 10 to broadcast, in a trigger track associated with a broadcast channel, a substitutional break schedule comprising a list of campaign IDs for each substitutional slot. The receivers 1 tuned to that channel receive and process the substitutional break schedule in order to determine for each substitutional slot whether a locally stored media item is available having the campaign ID indicated for a specific slot; if so, that locally stored media item is inserted in the slot in place of a linear media item included in the broadcast channel. Optionally, each media item may comprise a plurality of versions (e.g. standard or high definition) of the same content, and the receiver 1 may select one of the versions for output, for example based on an output mode (e.g. standard or high definition).

The selected media items are cued by the receiver 1 for output at the defined splice points of the associated slots in the broadcast channel. The automation function next generates a splice point trigger at the point indicated by the substitutional slot which is then relayed to the encoder and used to signal the receiver to condition the output stream for splicing. The splice points may be defined as splice events within the broadcast channel, using for example the SCTE 35 standard. When the receiver 1 receives the splice event, it outputs the locally stored media item selected for the corresponding slot, if available, in place of the live broadcast stream. At the end of the substitutional slot(s), indicated by the duration of the splice event or by a further splice event, the output of the receiver 1 reverts to the live broadcast stream.

In an update step S7, the receiver 1 may delete stored media items which are no longer required, for example which no longer match the stored profile data after the latter is updated, or for which the associated campaign has expired. The receiver 1 may also delete campaign-specific profile data items and/or campaign metadata associated with an expired campaign. Alternatively, previous versions of at least profile data and campaign metadata may be stored at the receiver 1 for reporting or diagnostic purposes.

The receiver 1 may update a counter associated with a specific campaign if a media item associated with that campaign has been output. The receiver may update a counter associated with respective individual media items, when that media item is output. The receiver 1 may transmit the viewing data 7 associated with a particular campaign to the profile management function 11, where the database 13 may be updated with the viewing data 7.

Recording & Playback

The above embodiments have been described mainly with reference to live viewing of broadcast programming, with insertion of substitutional media items into the displayed live broadcast stream. In one embodiment where the received broadcast stream is recorded locally by the receiver 1, such as a PVR, the inserted substitutional items may be recorded within the recording of the received broadcast stream, so that the displayed content on playback is identical to that seen when watching the live broadcast stream with any inserted substitutional media items. This embodiment is advantageous in that the user may see on playback exactly the same content as was seen when viewing the broadcast stream live. It should be noted, however, that the above embodiments do not require the broadcast stream to be viewed live; instead, the stream could be recorded for later viewing, with substitutional media items being inserted during recording, or linked to the recorded programme so that they are retrieved automatically and spliced in on playback.

In an alternative embodiment, the recording may include data identifying the splice points and substitutional schedule, and media substitution may be performed on playback, provided the necessary campaign metadata, profile data and substitutional items are still available at the receiver; these items may be saved for the duration that the associated recording is maintained at the receiver 1. This approach is more flexible, since any updates to the profile data, campaign metadata and/or substitutional items may be taken into account when selecting a substitutional item for playback. However, the user experience is different from conventional recording, in which the user expects to see on playback the same content that was previously viewed live.

Viewing Measurement and Reporting

It is also desirable to determine, or at least reliably estimate, the ratings of each campaign, in other words how many times the campaign has actually been displayed, and optionally, to how many viewers of the target demographic profile of the campaign. In a conventional linear advertising model, survey evidence is used to estimate the viewing figures for each channel at a particular time, and the ratings for a particular campaign are derived from those figures. In a substitutional advertising model, additional information is needed to apportion those figures to each of the substitutional options within a slot S, particularly if one substitutional slot contains options from different campaigns.

More generally, it is desirable to produce viewing data 7 with a high confidence that the relevant content is being viewed. Problems that may be encountered include:

Surfing events: short duration events which do not correspond to legitimate viewing, as viewers change channels rapidly to avoid commercials/advertisements.

Receiver On/Display Off: these are typically long duration events where the display 3 has been switched off, but the receiver 1 is still on, giving the false impression that content is still being watched. A similar problem occurs when the receiver 1 and display 3 are left on during the day<without anyone being at home, or even during the night.

Figure 5:
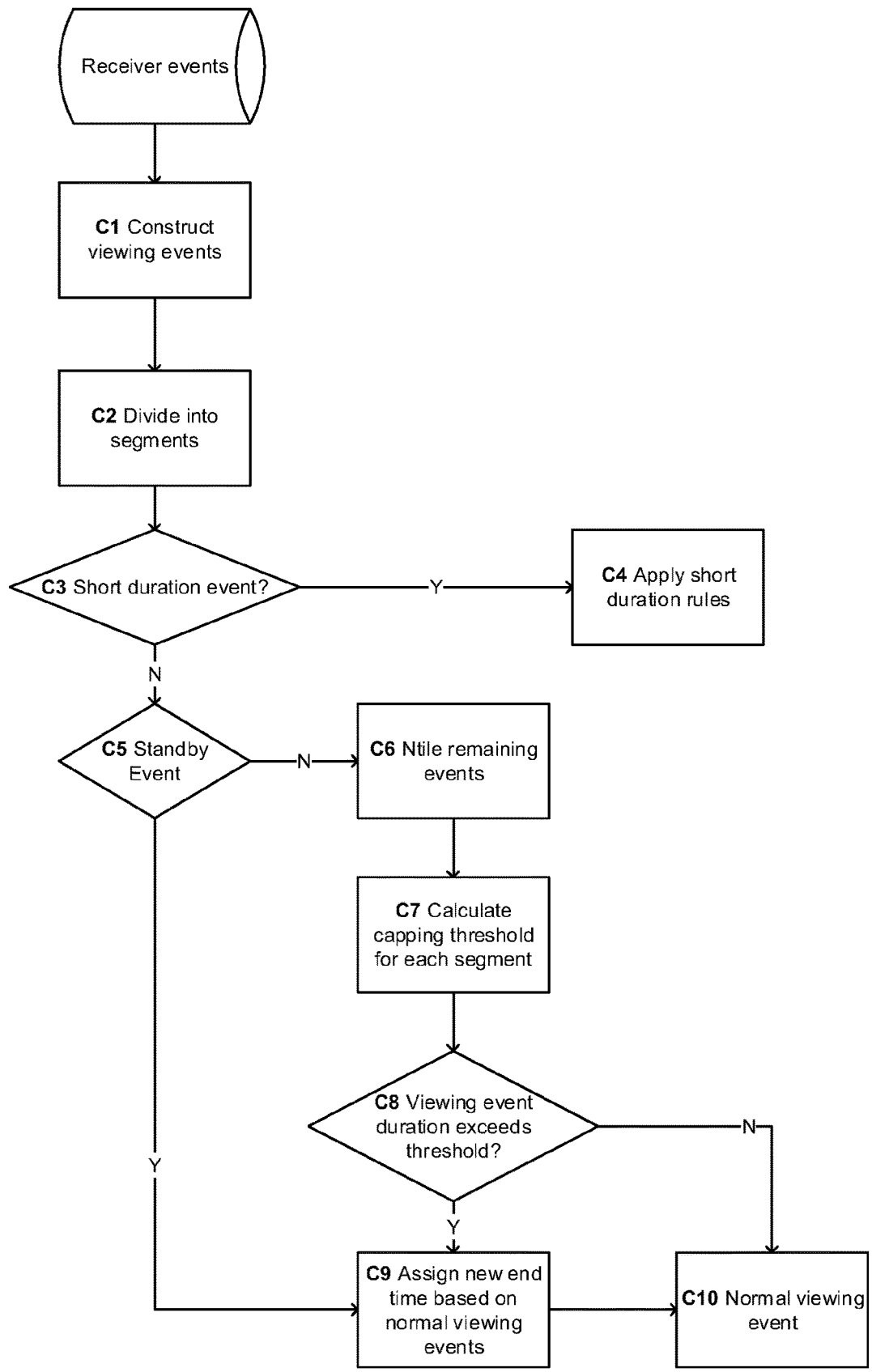
FIG. 5 is a flowchart of a method of processing viewing events in an embodiment of the present invention.

In the present embodiment, the viewing data processor 14 processes the viewing data 7 as received from the receivers 1, and performs the following steps, as illustrated in FIG. 5:

1. For each receiver 1, combine the receiver events to produce relevant viewing events (step C1). For example, a receiver event representing viewing a channel at normal playback speed, followed by a receiver event representing a change away from that state, is used to generate a viewing event for that channel between the times of the two events.
2. For the viewing events across a plurality of receivers 1, divide the viewing events into unique segments (step C2).
3. For viewing events in each segment, identify short duration events (step C3) and apply short duration rules (step C4) e.g. to remove or discount events which are unlikely to represent viewing activity.
4. For viewing events in each segment, calculate a capping threshold (step C7).
5. Identify viewing events having a duration greater than the corresponding capping threshold in the corresponding segment (step C8).
6. Assign a new end time to those events (step C9).

Each of steps 2 to 6 will be described in more detail below.

Split Viewing Events into Segments

In this step, viewing events are split hierarchically into distinct segments defined by a unique combination of variables which drive viewing behaviour. Examples of such variables are listed in Table 2 below:

TABLE 2

Segment Variables

| Play Type | Day of week | Start Hour | Box Type | Channel Pack | Genre |
|---|---|---|---|---|---|
| Live | Weekday | Early | Primary | Terrestrial | Children |
| Playback | Weekend | Morning/ | Secondary | Terrestrial | Entertainment |
| (Live/Pause, | | Day | | Non- | Movies |
| Time-shift, On | | Afternoon/ | | Commercial | Music & |
| Demand) | | Early | | Diginets | Radio |
| | | Evening | | Diginets | News & |
| | | Mid to late | | Non- | Documentaries |
| | | Evening | | commercial | Specialist |
| | | | | Other | Sports |
| | | | | Other Non- | Undefined |
| | | | | commercial | |

'Box Type' refers to a multi-room setup in which multiple receivers 1 are present in the same household and under the same subscription. One of these receivers 1 is designated as primary, for example for the purposes of remote recording, and may correspond to the main receiver 1 used for viewing. 'Channel Pack' refers to the type or category of channel.

The aim of splitting viewing events into segments is that viewing profiles within a segment should be similar and viewing behaviour throughout the segment can therefore be used to apply capping thresholds. The following examples illustrate reasons for choosing the above variables:

- Playback events are split into three groups according to their viewing behaviour (Live/Pause are created after an initial pause on the live stream, and are therefore similar to live events in terms of viewing behaviour, Time-shift and On Demand represent the other modalities of playback)
- Live events are more likely to be capped, as viewers may turn off the display 3 but leave the receiver 1 on, and therefore merit different rules.
- Lifestyle and work patterns change throughout the week: morning viewing differs between the weekend and weekdays, with Bank holidays treated as weekends.
- Interaction changes throughout the day, with viewers more likely to leave the receiver 1 on during working day or late at night.
- Viewing on the primary receiver 1 generates different behaviour with greater interaction compared to the secondary receiver 1.
- Terrestrial viewing differs from other channel packs. Terrestrial channels are seen as the channels of choice and therefore often have longer duration viewing events.
- Genres affect the way people watch TV. For example, sports are viewed differently to movies, news or children's programmes, resulting in differing viewing durations and capping rules.

Figure 6:
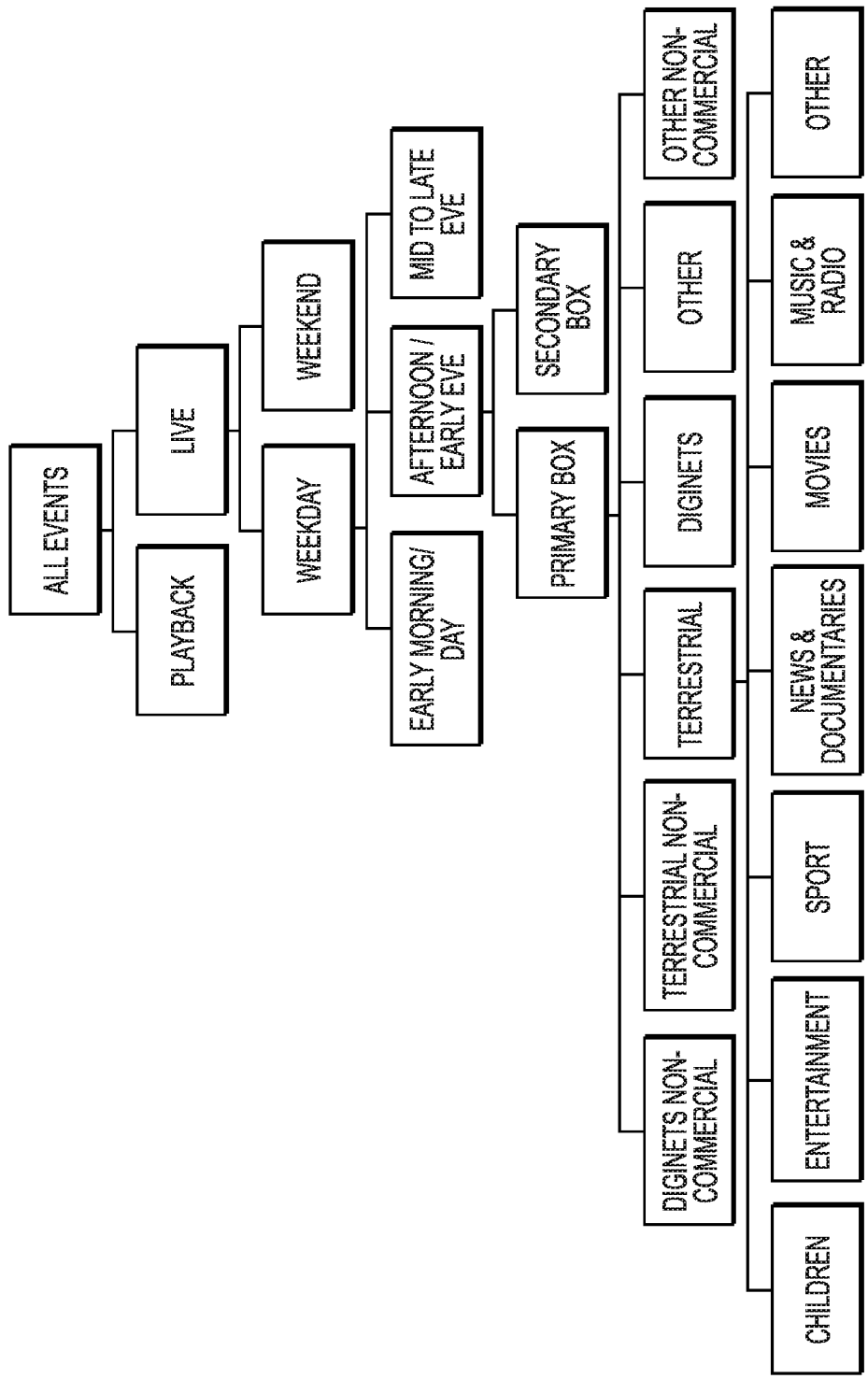
FIG. 6 is a diagram of an example of a hierarchical tree of segments in an embodiment of the invention.

FIG. 6 shows a hierarchical tree of the segments as defined by the variables; for clarity, only one branch is shown fully i.e. Live, Weekday, Afternoon/Early Evening, Primary Box, Terrestrial, [Genre]. There may be over a thousand different segments, formed by a combination of the above variables. For example, another branch may be Live, Weekend, Afternoon, Primary Box, Diginets, Movies.

Each segment puts viewing events into categories which are likely to share similar viewing behaviour, so that anomalous viewing events can be identified by comparison with other events within the same category. In particular, time of day and content properties, such as channel and genre, are included as these materially affect the viewing event duration distribution across a population.

Once the viewing events have been categorised into segments as above, the next step is to examine the population distributions in order to establish which viewing events are anomalous and therefore require adjustment, such as capping.

Short Duration Events

Within each segment, the distribution of viewing event durations is examined in order to identify a peak number of events of short duration (e.g. in the range 3-6 seconds) corresponding to 'channel surfing' behaviour. A threshold is calculated based on this peak, and viewing events of a duration below this peak have their duration reduced to zero, so as to mitigate the effect of these viewing events on the overall viewing behaviour of users. Alternatively, these viewing events may be discarded or deleted.

Long Duration Event Capping

To address the problem of long duration viewing events that do not correspond to actual viewing of content, the population of long duration viewing events within each segment is examined to identify candidates for capping. First, viewing events that were terminated by the receiver 1 going in to standby (evStandbyIn) are automatically selected as candidates for capping (step C5), as standby is initiated in response to user inactivity at the receiver 1.

Next, the remainder of the viewing events within each segment are divided into ntiles (i.e. making n subdivisions of equal numbers of viewing events of a sample) according to the duration of the viewing events (step C6). Within each ntile, the median duration is taken as an indicator of the duration of the viewing events. In one example, 200 ntiles were used, but fewer or more ntiles may be used. The duration distribution for each segment is then examined to identify changes in viewing event duration corresponding to normal or outlying viewing events.

The process of long duration event capping the proceeds by the following steps:

- Identifying outlying viewing event behaviour, from which a threshold is calculated in order to identify which events need to be capped.
- Collecting all the viewing events to be capped, including the standby events identified in the preliminary step.
- Applying a capping method to those events, to reflect the underlying normal viewing behaviour of the viewing population.

Calculating Capping Thresholds

Viewing events can be categorised by event duration into two groups: normal viewing behaviour and outlying viewing behaviour which needs to be capped in duration, representing for example the receiver on/display off case. The division between these groups is categorised by a rapid increase in event duration. This inflection point in the median duration ntile curve represents a change from normal to outlying behaviour and therefore a suitable threshold. This threshold may be calculated (step C7) as a fixed constant or may be dynamically calculated from the properties of the median duration curve (for example from the change in the gradient and/or other properties of the curve). The threshold may be calculated independently or separately for each segment, taking into account content-led behaviour such as the genre associated with the viewing event, the time of day of the start time, or the channel that was being viewed, for example. The threshold may have minimum and/or maximum levels.

Figure 7:
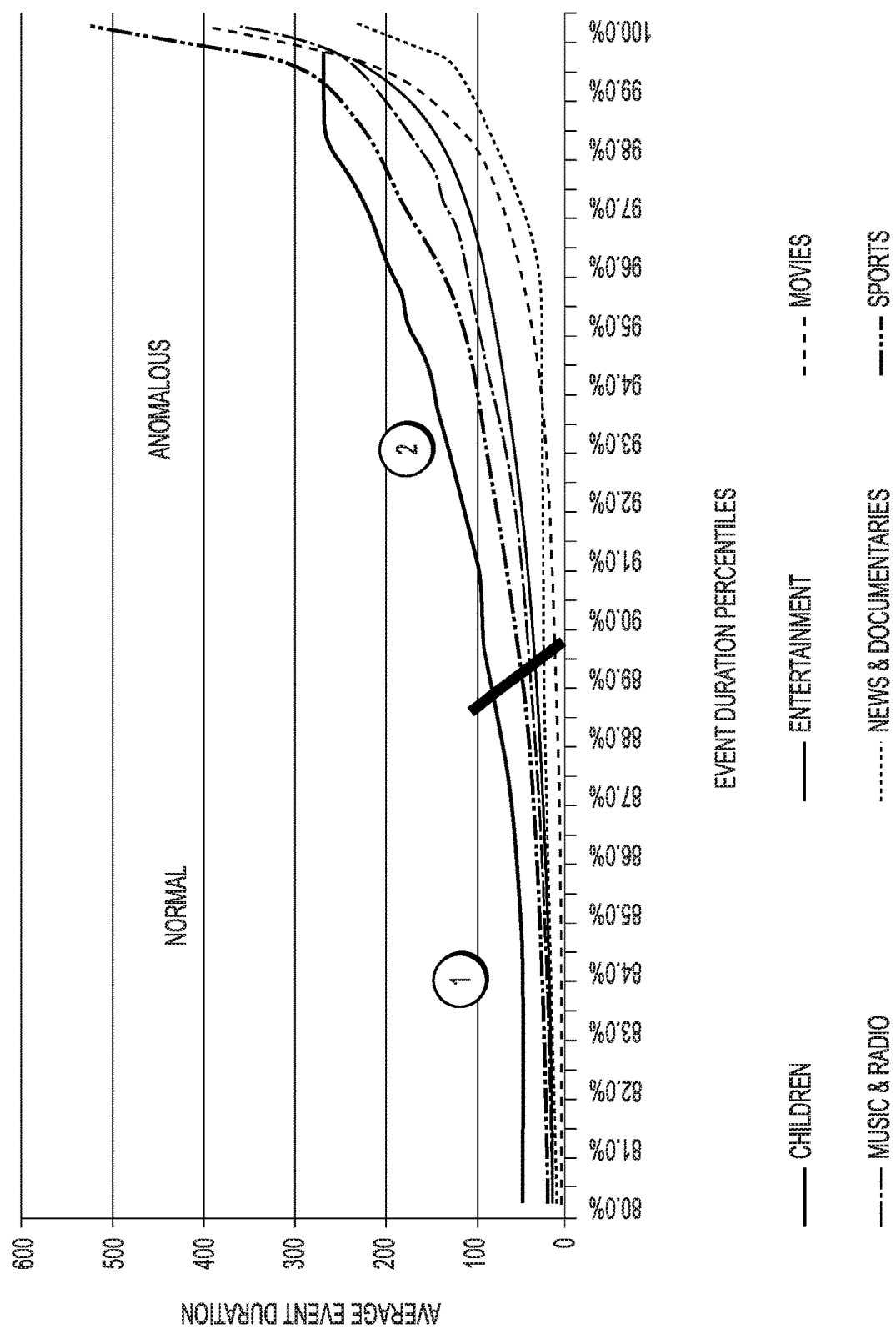
FIG. 7 is a graph of the duration distributions of viewing events for different genre segments in the embodiment.

Once the threshold is determined, those viewing events having a duration below this threshold are categorised as normal viewing behaviour (steps C8, C10), and those above the threshold are categorised as anomalous viewing events which need to be reduced in duration. In the example shown in FIG. 7, viewing event duration curves are shown for segments corresponding to different genres within the category Live, Weekday, Start 2-3 pm, Primary Box and Terrestrial.

In the above example, the viewing events within a segment are divided into:

- Normal viewing events where viewers are likely to be watching content based on the viewing event duration distribution (which for a sample day could be around 90% of events, representing 58% of event duration)
- Anomalous viewing events where content is not likely being watched, which need to be capped in duration (which again as an example could be around 10% of events, or 42% of the total event duration)

Instead of making a strict distinction between legitimate and anomalous events, a probability distribution may be assigned to the viewing events such that viewing events above the threshold have a non-unity probability of being anomalous, and likewise that events below the threshold have a non-zero probability of being anomalous.

Capping Anomalous Viewing Events

In order to complete the process of adjusting the viewing event durations to have higher confidence that the actual content was being viewed, the duration of the anomalous viewing events is shortened (step C9), using the behavioural information contained in the normal viewing events.

Figure 8:
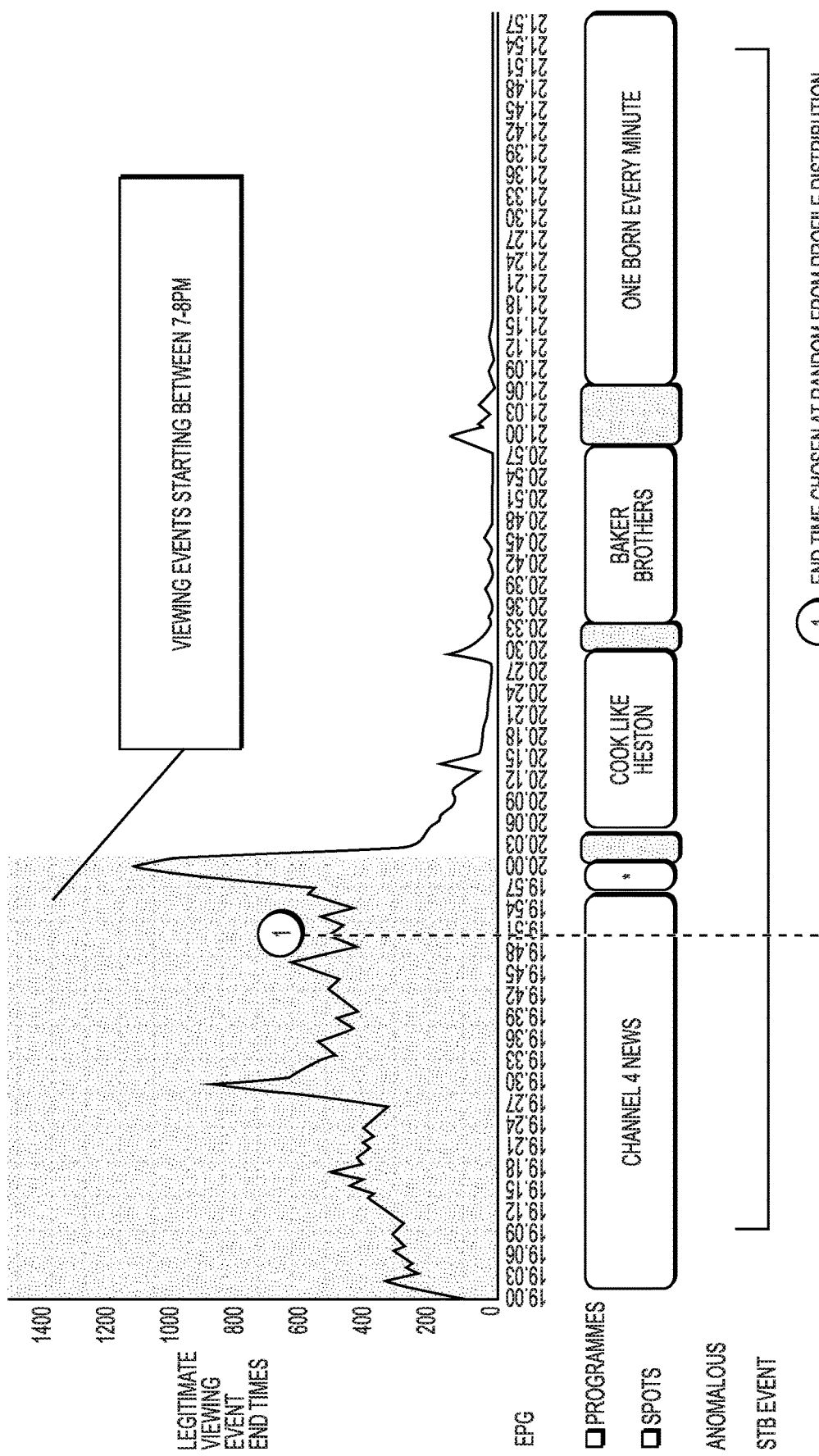
FIG. 8 is a diagram illustrating capping of an anomalous viewing event in an embodiment.

An example of this process is illustrated in FIG. 8. A candidate anomalous viewing event which needs to be capped starts around 19:10 and ends around 21:55. The normal viewing events which started at the same start hour (between 19:00-20:00) and on the same channel (in this case Channel 4) are selected and their end times graphed. These produce the profile shown, which gives an indication of when viewers were ending their viewing at a specific time. This profile illustrates normal viewing behaviour, and gives an indication of content-led behaviour, including ad breaks and any other major movements in viewing that is content specific (i.e. which originates from a particular program such as a news show or a cookery show).

To assign a new end time to the candidate anomalous viewing event, the profile is taken as a probability distribution, and the end time is assigned by randomly sampling from this distribution. Hence, the peak viewing event end times have a higher probability than the troughs, and over a large number of viewing events the overall shape of the normal event end time distribution is preserved. In this example, the end time was chosen to be around 19:49.

Alternatively, the profile curve may be parameterised as a function and then a random parameter chosen to produce an end time. The objective of any of these methods is to preserve key properties of the identified normal viewing behaviour.

Hence, the outputs of the capping process may include a set of viewing events for each segment, in which anomalous viewing events of long duration have been re-assigned a new end time representative of the likely end of viewing time. The outputs also may include capping parameters such as the threshold duration for each segment, indicating a duration above which viewing events may be considered anomalous. The outputs may include the profile, or parameters defining the profile. These outputs may be used to influence or control various technical aspects of a television broadcast system optionally including media insertion as described above. One such application will now be described below.

Capping at the Receiver

The above process applies capping to viewing events received from the receivers 1 after viewing. Alternatively or additionally, capping parameters may be sent to the receivers 1 in advance of viewing, so that the receivers 1 may themselves determine whether a current viewing event is likely to be anomalous.

For example, the receivers 1 may receive representative threshold values for each segment, determine the segment corresponding to a current viewing event, and detect when the duration of the current viewing event has reached the corresponding threshold. In response to the corresponding threshold being reached, the receiver 1 may take one or more predetermined actions, such as going into standby mode, prompting the user to press a key to confirm they are still watching and/or inhibiting media insertion so that only linear content is output, as described in more detail below with reference to FIG. 9.

At the viewing data processor 14, a time period is defined over which the average threshold per segment will be calculated. The viewing event data for that period is divided into segments, and an average capping threshold is calculated per segment, using a similar process to that described above with reference to FIG. 5, up to and including step C7. Optionally, at step C7', the average capping threshold for each segment is modified by a predictive model, in order to account for predicted future behaviour, based for example on the historical event data.

The average capping thresholds for each segment are then sent to the head end 2, for example via the scheduling function 8, for broadcast to the receivers 1. This process may be repeated periodically, with the time period being updated relative to the current time; for example, the thresholds may be calculated every week from viewing event data for the previous week. To avoid excess use of bandwidth, the new threshold for a segment may be broadcast to the receivers 1 only when there is a significant variation from the previous value.

The receiver 1 receives and stores the threshold values for each segment. If the receiver 1 has not received a threshold value for a particular segment, a default value such as 120 minutes may be set. The receiver 1 may modify the threshold values for each segment according to local data, for example according to local historical viewing data or household/viewer information. For example, the number of potential viewers in the household may affect the threshold values.

When a viewing event begins (step D1), the receiver 1 identifies the corresponding segment (step D2), for example using the following information:
- whether the output is live or playback
- day of the week
- current time of day
- whether the receiver 1 is a primary or secondary box. This may be determined by a flag linked to the identity of the smart card 114a. The flag value may be obtained via a network connection, or from broadcast metadata.
- category of the channel of the programming.
- genre of the programming. This may be obtained from EPG data.

The receiver 1 then retrieves the appropriate capping threshold (step D3) corresponding to the segment. The receiver 1 records the time elapsed since the last viewing event and compares the elapsed time to the capping threshold duration of the corresponding segment (step D4). In response to the elapsed time exceeding the threshold duration, the receiver 1 takes one or more corresponding actions, for example inhibiting media insertion (step D6) as described below. Otherwise, the receiver 1 continues to enable media insertion (step D7).

If a new viewer event is recorded, except for example a StandbyIn event, the receiver 1 may revert to step D1, and may for example enable media insertion once again.

While media insertion is inhibited, the linear media content may be output by the receiver and no media insertion events are recorded in the viewing data 7. Alternatively, media insertion may be allowed to take place, but the associated media insertion events may record that the capping threshold was exceeded.

Computer System

Figure 9:
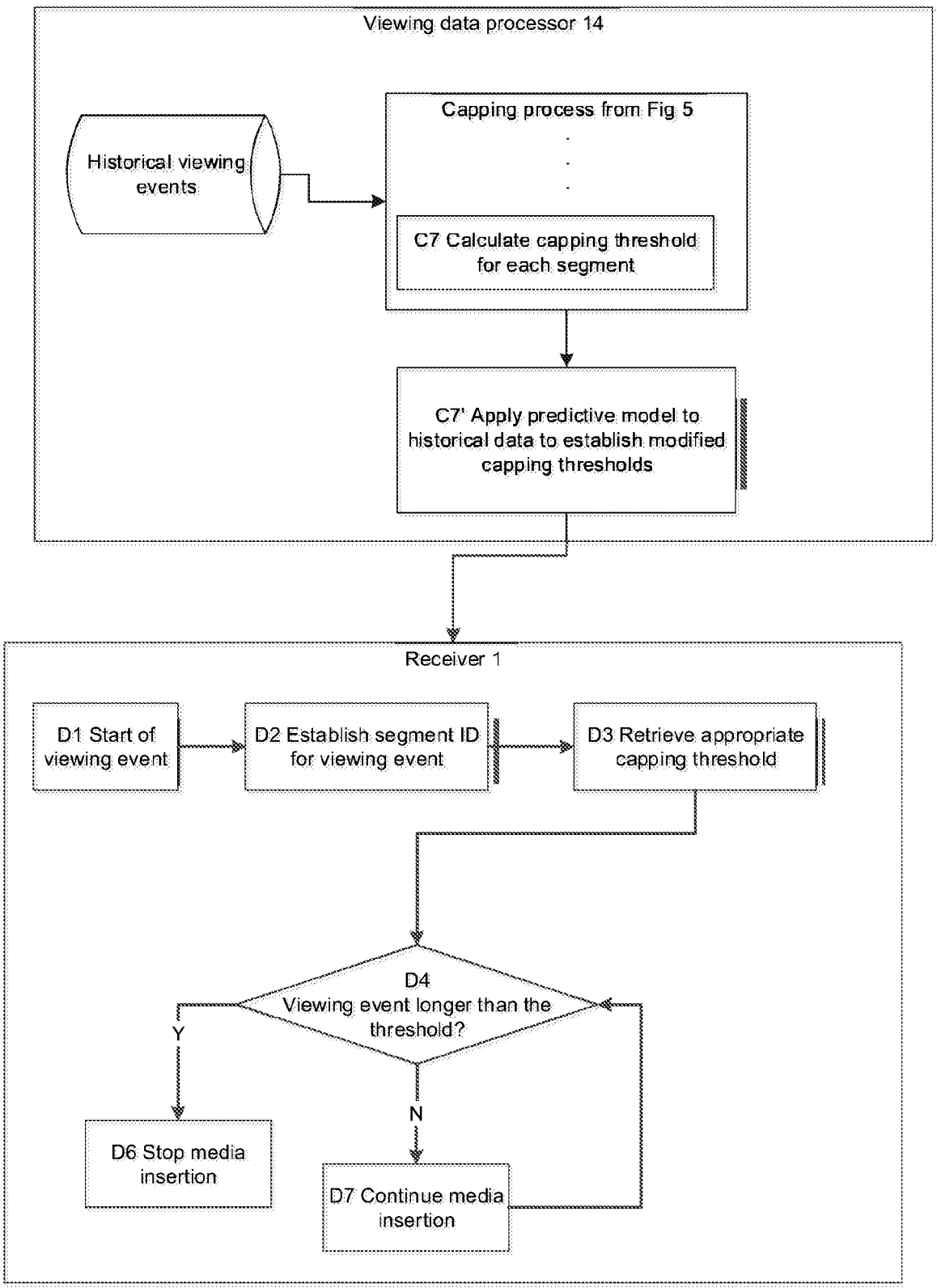
FIG. 9 is a flowchart of a method of setting capping at a receiver in an embodiment of the invention.
Figure 10:
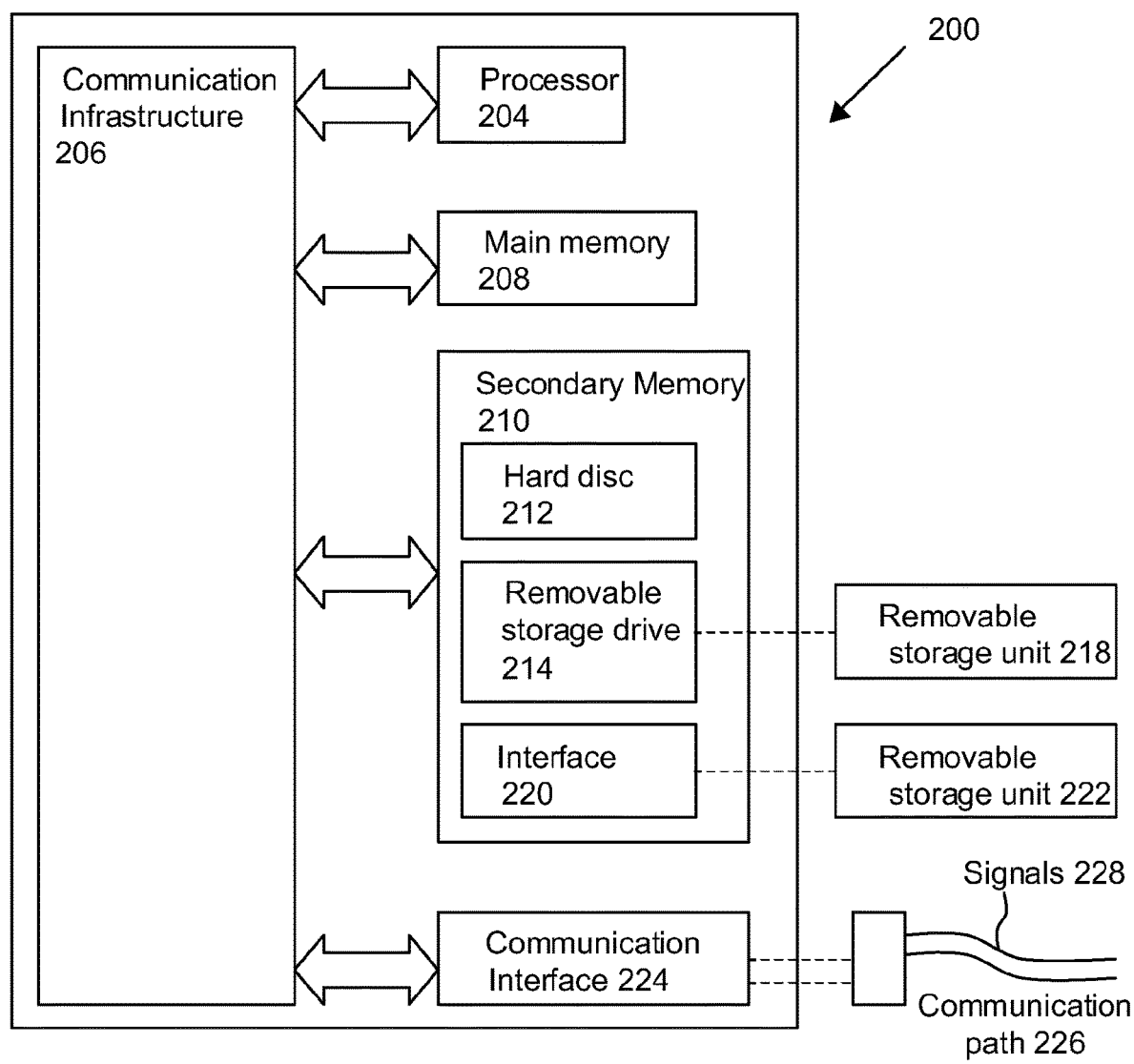
FIG. 10 is a diagram of the functional components of a specific embodiment of a computer system in embodiments of the invention.

The entities and functional items described herein, such as the viewing data processor 14 and/or scheduling function 8, may be implemented by computer systems such as computer system 200 as shown in FIG. 9. Embodiments of the present invention may be implemented as programmable code for execution by such computer systems 200. After reading this description, it will become apparent to a person skilled in the art how to implement the invention using other computer systems and/or computer architectures.

Computer system 200 includes one or more processors, such as processor 204. Processor 204 may be any type of processor, including but not limited to a special purpose or a general-purpose digital signal processor. Processor 204 is connected to a communication infrastructure 206 (for example, a bus or network). Various software implementations are described in terms of this exemplary computer system. After reading this description, it will become apparent to a person skilled in the art how to implement the invention using other computer systems and/or computer architectures.

Computer system 200 also includes a main memory 208, preferably random access memory (RAM), and may also include a secondary memory 610. Secondary memory 210 may include, for example, a hard disk drive 212 and/or a removable storage drive 214, representing a floppy disk drive, a magnetic tape drive, an optical disk drive, etc. Removable storage drive 214 reads from and/or writes to a removable storage unit 218 in a well-known manner. Removable storage unit 218 represents a floppy disk, magnetic tape, optical disk, etc., which is read by and written to by removable storage drive 214. As will be appreciated, removable storage unit 618 includes a computer usable storage medium having stored therein computer software and/or data.

In alternative implementations, secondary memory 210 may include other similar means for allowing computer programs or other instructions to be loaded into computer system 200. Such means may include, for example, a removable storage unit 222 and an interface 220. Examples of such means may include a program cartridge and cartridge interface (such as that previously found in video game devices), a removable memory chip (such as an EPROM, or PROM, or flash memory) and associated socket, and other removable storage units 222 and interfaces 220 which allow software and data to be transferred from removable storage unit 222 to computer system 200. Alternatively, the program may be executed and/or the data accessed from the removable storage unit 222, using the processor 204 of the computer system 200.

Computer system 200 may also include a communication interface 224. Communication interface 224 allows software and data to be transferred between computer system 200 and external devices. Examples of communication interface 224 may include a modem, a network interface (such as an Ethernet card), a communication port, a Personal Computer Memory Card International Association (PCMCIA) slot and card, etc. Software and data transferred via communication interface 224 are in the form of signals 228, which may be electronic, electromagnetic, optical, or other signals capable of being received by communication interface 224. These signals 228 are provided to communication interface 224 via a communication path 226. Communication path 226 carries signals 228 and may be implemented using wire or cable, fibre optics, a phone line, a wireless link, a cellular phone link, a radio frequency link, or any other suitable communication channel. For instance, communication path 226 may be implemented using a combination of channels.

The terms "computer program medium" and "computer usable medium" are used generally to refer to media such as removable storage drive 214, a hard disk installed in hard disk drive 212, and signals 228. These computer program products are means for providing software to computer system 200. However, these terms may also include signals (such as electrical, optical or electromagnetic signals) that embody the computer program disclosed herein.

Computer programs (also called computer control logic) are stored in main memory 208 and/or secondary memory 210. Computer programs may also be received via communication interface 224. Such computer programs, when executed, enable computer system 200 to implement embodiments of the present invention as discussed herein. Accordingly, such computer programs represent controllers of computer system 200. Where the embodiment is implemented using software, the software may be stored in a computer program product and loaded into computer system 200 using removable storage drive 214, hard disk drive 212, or communication interface 224, to provide some examples.

Alternative embodiments may be implemented as control logic in hardware, firmware, or software or any combination thereof.

ALTERNATIVE EMBODIMENTS

The above embodiment is described with reference to a broadcast system, such as a satellite, cable or Internet broadcast system. Aspects of the invention are also applicable to a video on demand (VOD) or push video on demand (PVOD) system, in which a programme is received and/or displayed on demand, and includes one or more substitutional slots as part of the programme. The substitutional system may be applied in a similar way to the broadcast system described above.

The above embodiment is described with reference to substitutional advertising, but aspects of the invention are not dependent on the content or commercial nature of advertising. Substitutional systems as described above are applicable to other media types having other constraint and/or optimisation rules. For example, aspects of the invention are applicable to the distribution of programmes with substitutional segments, for example to allow display of alternative content depending on profile data at the receiver. In that case, there may be constraint rules which restrict which combination of segments can be output. In another example, aspects of the invention are applicable to public service or system announcements targeted at particular user profiles.

The above embodiment discloses a video broadcast system in which broadcast programmes and substitutional media content comprise video, and associated audio where applicable. However, aspects of the invention are applicable to audio-only content, such as digital radio broadcasts, or a mixture of video and audio-only content; for example, the broadcast programmes may be video programmes, and the substitutional media content may comprise audio-only content that is output over a still picture generated locally at the receiver.

The above embodiment discloses a time-divided system in which the insertable media items are output during breaks within or between programmes. However, the slots for insertable media items may be concurrent in time with programmes; for example, substitutional content may be superimposed on the display of a programme, or be added to or replace the audio output, for example for dubbing.

The substitutional media items are described in the specific embodiments above as comprising audio and/or video clips, but may alternatively or additionally comprise data and/or instructions that, when executed by the receiver 1, cause audio and/or video content to be output: for example, video items may be defined as 2D or 3D graphical objects, and audio items may be defined as musical instructions, such as MIDI files, or speech synthesis codes.

Alternative embodiments may be envisaged, which nevertheless fall within the scope of the following claims.

The invention claimed is:

1. A method of processing media output events from a plurality of media content receivers within a media distribution system, each of said media output events having a corresponding duration, the method comprising:
   a. dividing media output events received from a plurality of media content receivers into a plurality of segments, such that media output events having similar properties are placed into the same segment;
   b. for each said segment, calculating a long duration threshold based on the distribution of the durations of the media output events within that segment;
   c. sending the calculated long duration thresholds to at least one media content receiver; and
   d. at the at least one media content receiver that receives the calculated long duration thresholds, determining the duration and segment of a current media output event, comparing the duration of the current media output event with a corresponding one of the received, calculated long duration thresholds, and modifying the current media output event according to the comparison, wherein the corresponding one of the received, calculated long duration thresholds is based on media output events from media content receivers other than the at least one media content receiver, wherein the at least one media content receiver that receives the long duration thresholds performs local media insertion within the current media output event, and the at least one receiver inhibits the local media insertion if the duration of the current media output event exceeds the corresponding long duration threshold.

2. The method of claim 1, wherein the output events each have a corresponding end time, the method including, for output events within a segment having a duration above the corresponding long duration threshold, modifying the corresponding end times so that the corresponding durations fall at or below the corresponding long duration threshold.

3. The method of claim 2, wherein the end times are modified according to the end times of other output events within the same segment having durations below the threshold duration.

4. The method of claim 3, wherein the modified end times are selected randomly or pseudo-randomly according to the distribution of the durations of the other output events having durations below the long duration threshold.

5. The method of claim 1, wherein the properties of the output events include one or more of: whether the output events are live or playback, time and/or day of output, receiver type, channel type and genre.

6. The method of claim 2, wherein for output events ended by the corresponding receiver automatically terminating output, the end times are modified so as that the corresponding durations fall at or below the corresponding long duration threshold.

7. The method of claim 1 including, prior to identifying the long duration threshold for each segment, removing or cancelling output events having a short duration not corresponding to normal viewing.

8. The method of claim 1, wherein at least one of the receivers that receives the long duration thresholds prompts the user to confirm that the current media output event is being watched, if the duration of the current media output event exceeds the corresponding long duration threshold.

9. The method of claim 1, wherein at least one of the receivers that receives the long duration thresholds goes into standby mode if the duration of the current media output event exceeds the corresponding long duration threshold.

10. The method of claim 1, wherein one or more of the receivers modifies the received long duration thresholds according to local data.

11. A non-transitory computer program product comprising program code arranged to perform the method of claim 1 when executed on a suitable configured processor or processors.

12. A media distribution system, comprising:
   a. one or more media sources for providing media content to a plurality of receivers;
   b. said plurality of receivers, each arranged to record media output events relating to media output at the respective receiver; and
   c. an output event processor arranged to:
      i. receive the media output events from the plurality of receivers;
      ii. divide the media output events into a plurality of segments, such that media output events having similar properties are placed into the same segment;
      iii. for each said segment, calculate a long duration threshold based on the distribution of the durations of the media output events within that segment; and
      iv. send the calculated long duration thresholds to at least one of the receivers, wherein the at least one of the receivers is arranged to:
         determine the duration and segment of a current media output event,
         compare the duration of the current media output event with a corresponding one of the received, calculated long duration thresholds, and
         modify the current media output event according to the comparison;
      wherein the corresponding one of the received, calculated long duration thresholds is based on media output events from media content receivers other than the at least one media content receiver, wherein the at least one media content receiver that receives the long duration thresholds performs local media insertion within the current media output event, and the at least one receiver inhibits the local media insertion if the duration of the current media output event exceeds the corresponding long duration threshold.

* * * * *